United States Patent [19]
Norrell et al.

[11] Patent Number: 5,793,821
[45] Date of Patent: Aug. 11, 1998

[54] TIMING RECOVERY USING GROUP DELAY COMPENSATION

[75] Inventors: Andrew L. Norrell, Nevada City, Calif.; Vladimir Parizhsky, Chicago, Ill.

[73] Assignee: 3Com Corporation, Skokie, Ill.

[21] Appl. No.: 472,918

[22] Filed: Jun. 7, 1995

[51] Int. Cl.$^6$ .............................. H04L 7/04; H04L 27/32
[52] U.S. Cl. .......................... 375/355; 375/326; 375/362
[58] Field of Search ..................... 375/324, 355, 375/326, 316, 322, 327, 340, 346, 347, 348, 362, 364, 229, 230, 232; 329/345, 346, 304, 306, 307; 364/724.2, 724.19, 724.1, 724.01, 724.03, 724.06

[56] References Cited

U.S. PATENT DOCUMENTS

| | | |
|---|---|---|
| 3,902,014 | 8/1975 | Lindell et al. . |
| 4,061,978 | 12/1977 | Motley et al. . |
| 4,064,361 | 12/1977 | Kustka et al. . |
| 4,180,783 | 12/1979 | Khalifa . |
| 4,280,099 | 7/1981 | Rattlingourd . |
| 4,334,313 | 6/1982 | Gitlin et al. . |
| 4,348,769 | 9/1982 | Kittel . |
| 4,411,000 | 10/1983 | Kustka . |
| 4,455,665 | 6/1984 | Kromer, III ............ 375/110 |
| 4,606,045 | 8/1986 | Miller ................... 375/13 |
| 4,669,090 | 5/1987 | Betts et al. ............ 375/8 |
| 4,669,092 | 5/1987 | Sari et al. . |
| 4,692,931 | 9/1987 | Ohsawa . |
| 4,726,043 | 2/1988 | Levesque . |
| 4,727,534 | 2/1988 | Debus, Jr. et al. . |
| 4,797,898 | 1/1989 | Martinez ............... 375/7 |
| 4,815,103 | 3/1989 | Cupo et al. . |
| 4,841,167 | 6/1989 | Saequsa . |
| 4,847,876 | 7/1989 | Baumbach et al. . |
| 4,847,880 | 7/1989 | Kamerman et al. . |
| 4,849,998 | 7/1989 | Poklemba . |
| 4,888,790 | 12/1989 | Wong et al. . |
| 4,896,334 | 1/1990 | Sayar . |
| 4,918,406 | 4/1990 | Baumbach et al. . |
| 4,956,851 | 9/1990 | Wolensky et al. ........ 375/8 |
| 5,022,058 | 6/1991 | Yoshida et al. . |
| 5,068,628 | 11/1991 | Ghoshal . |
| 5,103,464 | 4/1992 | Capkun et al. . |
| 5,159,609 | 10/1992 | Palicot . |
| 5,170,415 | 12/1992 | Yoshida et al. . |
| 5,173,663 | 12/1992 | Ichiyoshi . |
| 5,228,064 | 7/1993 | Viviano . |
| 5,255,289 | 10/1993 | Tomita . |
| 5,285,482 | 2/1994 | Sehier et al. . |
| 5,311,544 | 5/1994 | Park et al. . |
| 5,353,312 | 10/1994 | Cupo et al. . |
| 5,383,220 | 1/1995 | Murai . |
| 5,400,365 | 3/1995 | Tulai . |

OTHER PUBLICATIONS

Godard, (1978), "Passband Timing Recovery in an All-Digital Modem Receiver," IEEE Transactions on Communications, vol. Com 26, No. 5, pp. 517–523.

International Search Report for PCT/US96/09921 mailed Sep. 3, 1996.

Primary Examiner—Chi H. Pham
Assistant Examiner—William Luther
Attorney, Agent, or Firm—McDonnell Boehnen Hulbert & Berghoff

[57] ABSTRACT

An electronic transmit/receive device employs an equalized envelope derived timing system to compensate for differential time delay occurring at upper and lower bandedges of the received signal. The received signal is split into a complex signal and the envelope derived timing system is utilized to perform amplitude and delay distortion compensation on the received signal. The amplitude and delay distortion compensation is performed by employing band-edge filters which preferably take the form of Finite Impulse Response (FIR) filters.

16 Claims, 4 Drawing Sheets

TIMING RECOVERY USING GROUP DELAY COMPENSATION

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to electronic communication systems and, more particularly, to a system for timing recovery in a receiver. A receiver accepts a transmission signal sent to it by a remote transmitter over a transmission medium, such as, for example, a telephone cable, microwave link, or other "channel." Such media introduce distortion, noise and other impairments into the received signal, which can cause the receiver to make decoding errors, such that the receiver does not receive an exact duplicate of the message, or symbols, being transmitted.

A transmitter, such as found in a modem, typically parses a message into groups of bits, and encodes each of these groups of bits into symbols, thus creating a sequence of symbols from a sequence of bits. These symbols are complex numbers of the form a +j*b, where j is the square root of the value (−1). The full set of allowed complex numbers for a given modulation system of a transmitter is known as the system's signal constellation. The encoding process is performed at a periodic rate, called the symbol rate. Once generated, the symbols are filtered by the transmitter to control signalling bandwidth, and then modulated by a carrier wave, which creates a signal that is suitable for transmission over a communication channel.

The exact symbol rate of a transmitter is typically under the control of a local time reference, such as a crystal oscillator. While, it is possible to communicate this timing information explicitly, the system constraints of most transmitters are usually such that it is undesireable to invest either signalling bandwidth or increase signal power for this purpose. Therefore, the discrete amplitude and phase changes imposed on the carrier wave are actually used to convey two things to the receiver: the data sequence, and the timing information necessary to decode this sequence at the receiver.

A receiver, such as found in a modem, is designed to estimate the transmitted sequence with the minimum number of errors possible. Ideally, the receiver's local timing reference will be identical to that of the remote transmitter, in both frequency and phase. However, modems for data communication over the telephone network can have local clock references that vary as much as +/−200 parts per million (ppm) between remote transmitter and local receiver. Thus, because of such discrepancies, the receiver must extract information from the incoming signal in order to estimate the frequency and phase of the clock associated with the incoming signal, so that the incoming signal may be sampled at the optimum times.

A common method used for recovering timing from such a waveform is called Envelope Derived Timing (EDT), which is based on the phenomena that periodic changes in phase and amplitude in the carrier waveform cause changes in the carrier's power envelope. A receiver utilizing EDT can reconstruct the symbol rate clock from the variations in the power envelope detected by the receiver.

A carrier waveform modulated by the transmitter in the manner described above will occupy a frequency spectrum that is centered around the carrier frequency and at least as wide as the symbol rate, plus some excess bandwidth. The portion of this spectrum that is associated with the power envelope are the regions centered at the carrier frequency plus one-half the symbol rate and the carrier frequency minus one-half the symbol rate. These two frequency regions are generally known as the band edges.

Unfortunately, the power envelope of a signal can be adversely affected by channel impairments, particularly amplitude and phase distortion at the band edges. To compensate for such impairments, many receiver designs include an adaptive equalizer which compensates for amplitude and phase distortion on the transmission channel in the data recovery path. Such equalizers depend on accurate timing recovery in order to function properly. For example, some systems have sometimes used a straightforward timing loop configuration, without compensating for amplitude or delay distortion of the transmitted message. With careful tuning of the receiver, this approach may prove adequate for slower transmissions with, for example, a transmitted symbol rate of 2400 symbols per second ("s/s"). See the standards adopted by the International Telecommunications Union—Telecommunications Standardization Sector ("ITU-T") up through v.32bis. However, faster transmission rates may require better techniques for recovering timing information.

Typically, a receiver reconstructs the timing envelope from energy near the upper and lower bandedges of the signal. Often, the wider the bandwidth used, the more distortion that is introduced into the signal by, for example, the transmission channel. Indeed, the requirements of ITU-T Standard v.34, which describes symbol rates as high as 3429 s/s, pushes the signal bandedges (where useful timing information is located) into severely distorted regions of telephone channels.

In such frequency regions, there is substantial rolloff (reduced signal strength) induced by the telephone transmission line. Further, these frequency regions may be subjected to considerable delay distortion. This type of distortion, which is related to the rate of change of phase with respect to frequency, causes signal energy in one band edge to arrive at the receiver at a different time than energy from the other bandedge. The timing envelope is most robust when the energy from the upper and lower sidebands arrives at the timing envelope detector simultaneously, and is degraded otherwise. For example, if the delay characteristic of a given channel is 5 milliseconds at the lower bandedge and 2 milliseconds at the upper bandedge, then if the transmitter simultaneously sends a burst of energy at both bandedges, the upper bandedge portion of this energy will arrive 3 ms. before the lower bandedge energy. If the transmitted burst is of 5 ms. duration, then there will be a strong envelope for 2 ms., but if the burst is of 2 ms. duration, there is no real timing information available to the receiver. The data sent by the transmitter is intentionally randomized in order to achieve certain spectral characteristics. Since timing energy is implicit in the phase and amplitude of the carrier wave, some data patterns (ie., those with dramatic changes) produce a strong timing signature while others do not. Short sequences rich in timing information patterns are more likely than long ones. Therefore, in order for the receiver to extract as much timing information as possible, it is important not to waste shorter patterns bursts, such as those of less than 3 ms. in the example above. These short patterns are wasted in a system that does not have timing equalization.

The timing recovery system in a modem's receiver is often the limiting factor in achieving high transmission speeds on a telephone channel. The rest of the modem receiver's systems, such as, for example, equalizers, carrier tracking loops, and echo cancelers, are often capable of operating at higher data rates than the timing recovery system. In order to maintain high symbol rate transmission, some have simply tried not to operate on channels with severely limited transmission characteristics, or, alternatively, have used complex techniques of questionable stability.

SUMMARY OF THE INVENTION

Applicants have noted that, on certain channels with severe delay distortion at higher or lower frequencies, a major limitation to higher symbol rate transmission is often the relative delay distortion of the modem signal at the bandedges. Thus, in a principal aspect, the present invention relates to an envelope derived timing system in a data receiver.

The system receives a signal that has been modulated by changing the amplitude and phase of the carrier at discrete periodic intervals. The signal is sampled and digitized by an Analog to Digital Converter at a sample rate that is high enough to preserve the information content of the incoming signal. The signal may be used by, for example, an equalizer and decoder, to obtain a data signal.

The system includes a timing interpolator and a timing loop interconnected to the timing interpolator. The timing loop includes a timing compensator which receives the sampled signal and delays upper and lower bandedge energy to compensate for delay distortion at the upper and lower bandedges. The timing compensator provides time-compensated component signals. A timing recovery system processes the time-compensated component signals and responsively provides a phase control signal to the interpolator.

Thus, an object of the present invention is improved envelope derived timing recovery in an electronic data transmission system. Another object is a timing recovery system that more reliably allows the transmission of data at a higher rate. Still another object is a timing recovery system that operates more reliably with transmission lines that introduce impairments into a transmitted signal. These and other objects, features, and advantages of the present invention are discussed or apparent in the following detailed description.

BRIEF DESCRIPTION OF THE DRAWINGS

The preferred embodiment of the present invention is described herein with reference to the drawings wherein.

DETAILED DESCRIPTION OF THE PREFERRED EMBODIMENT

Figure 1:
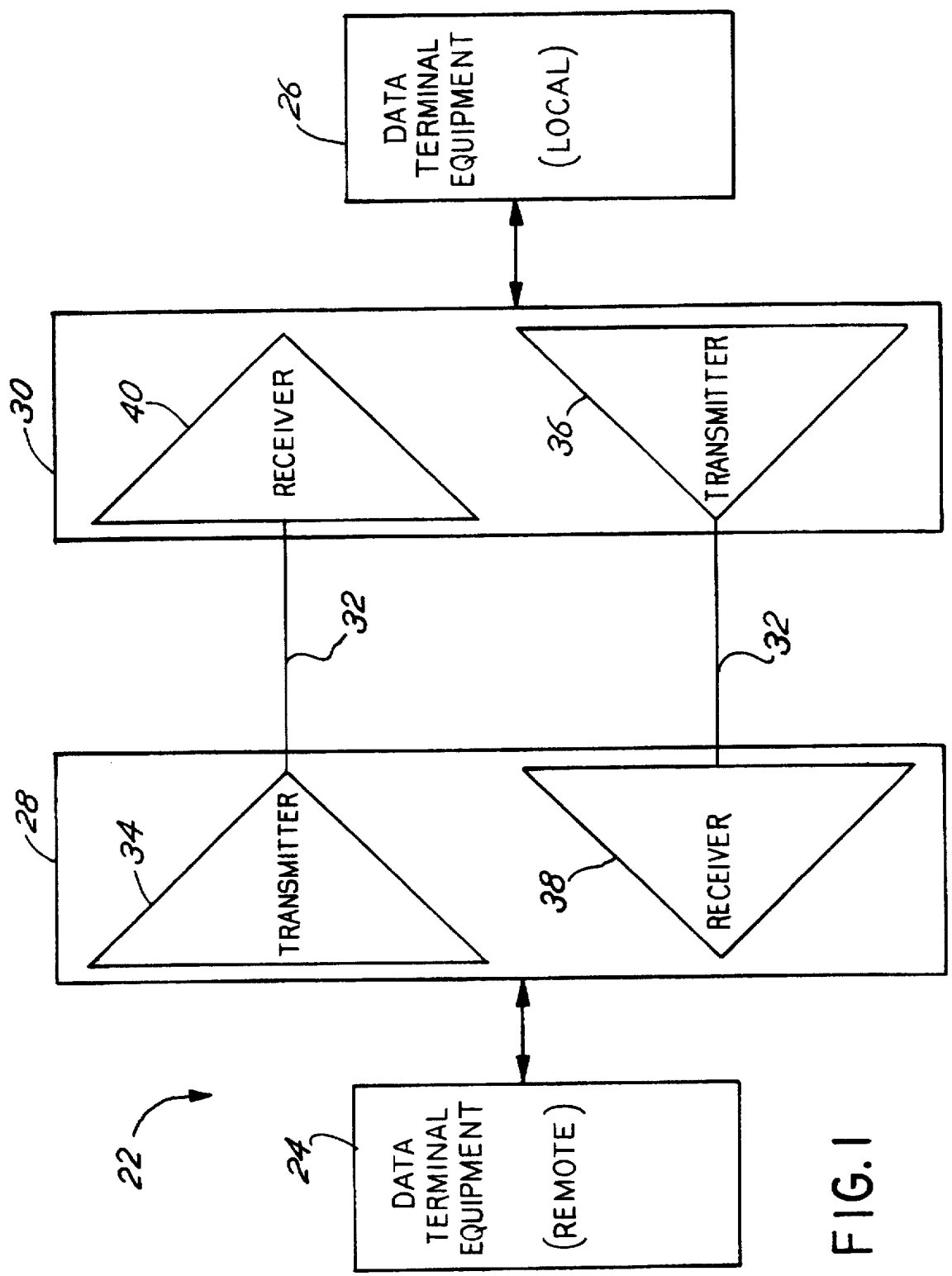
FIG. 1 is a block diagram of an electronic data transmission system utilizing the present invention.
Figure 2:
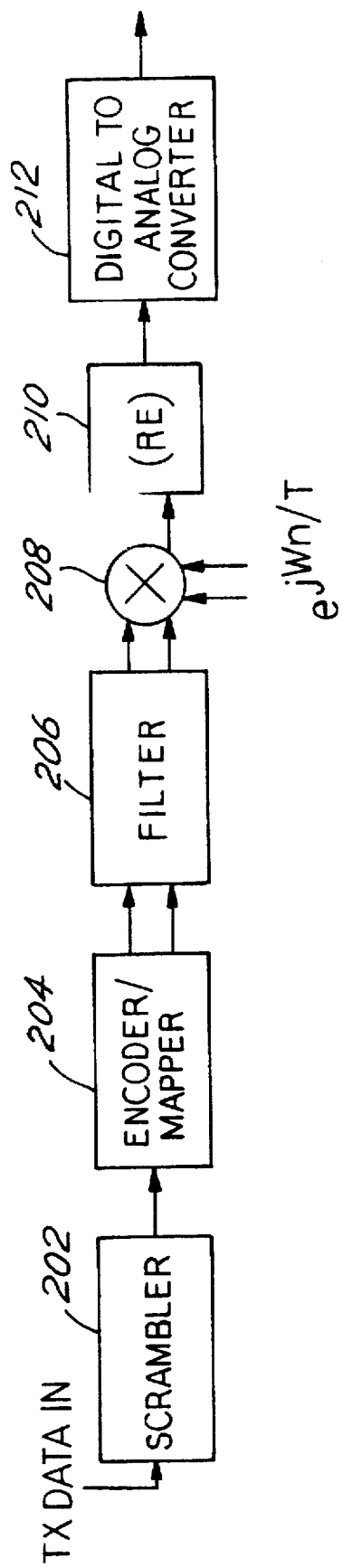
FIG. 2 is a block diagram of the transmitter shown in FIG. 1.

Referring to FIGS. 1–6, the present invention is shown as an equalized envelope derived timing system. The system is utilized in an electronic data transmission system 22. See FIG. 1. The transmission system 22 is shown in FIG. 1 for purposes of illustration only, since a great variety of such systems exist. The transmission system 22 includes two sources of information, such as exemplary computers 24, 26, and two transmit/receive devices, such as exemplary modems 28, 30, that are interconnected via a communication medium 32. The transmit/receive devices may, of course, be within, or a part of, the sources of information. The modems each include a transmitter 34, 36 for sending data along the medium, and a receiver 38, 40 for receiving the transmitted signal from the medium. As shown in FIG. 2, a transmitter may include a scrambler 202, encoder or mapper 204, filter 206, a complex multiplication operation 208 to shift the center frequency of the filtered symbols, and digital to analog converter 212. There are, of course, many different receiver and transmitter architectures. The structure shown in the drawings are for illustration purposes only. Preferably a modem such as seen in FIGS. 1–6 may be implemented by a microprocessor operating under stored program control. Such modems include a Read-Only Memory (ROM) for storage of control programs and permanent data and Random Access Memory (RAM) for temporary storage of programs and data. Input/Output (I/O) circuitry is incorporated either in the microprocessor or in peripheral chips for receiving and transmitting information to and from the microprocessor.

The data transmission device shown in FIG. 2 first randomizes, or scrambles data received from the computer. This operation insures the presence of timing energy in the subsequent transmit waveform. The data is advantageously randomized by the scrambler prior to any other processing in order to guarantee sufficient timing energy in the transmit signal.

Figure 3:
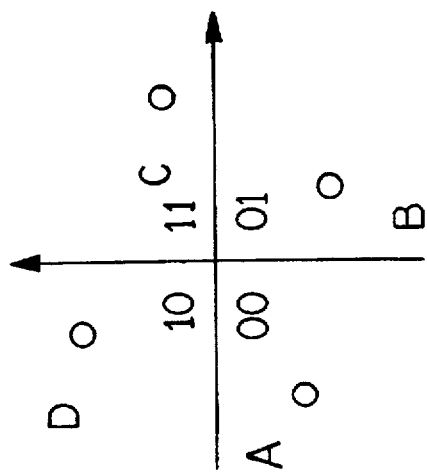
FIG. 3 is a graph illustrating a simple four-point mapping system that may be utilized by the transmitter shown in FIG. 2.

Next, the encoder/mapper maps and encodes data bits received from the scrambler into symbols at the rate of once per symbol period. FIG. 3 shows a simple four-point mapping system for 4800 bits per second ("bps") from ITU-T standard v.32 for 4800 bits per second transmission. In the simple illustrative example shown in FIG. 3, each pair of bits is mapped to one of four points. This data-to-symbol mapping may, in different systems, take one of the following forms: amplitude modulation, amplitude and phase modulation, generally known as Quadrature Amplitude Modulation (QAM), a combination of forward error correction and QAM called Trellis Coded Modulation (TCM), or one of various other techniques.

The resulting sequence of symbols is then processed by the filter 206 and summing point 208 to generate a complex signal 210. The real part of the complex signal is then converted at 212 to an analog waveform by the converter and transmitted via the communications channel to the other modem. The transmitting modem may be considered remote to the modem receiving the information.

The resulting transmit waveform passes through the communications channel and is processed by the receiver. The receiving device must, among other things, recover symbol timing in order to optimally decode the symbol stream, and thus recover the transmitted data. This is often done with a well-known technique called Envelope Derived Timing ("EDT").

A description of conventional timing recovery concepts can be found in *The Theory and Practice of Modem Design*, by John A. C. Bingham, Chapter 7, or *Digital Communication*, by Edward A. Lee and David G. Messerschmitt, Chapter 15. A description of interpolator based timing recovery can be found in Floyd M. Gardner's article: Interpolation in Digital Modems—Part 1: Fundamentals, IEEE Transactions on Communications, Vol. 41, No. 3, March 1993, or Part 2: Implementation and Performance, Vol 41, No. 6, June 1993.

Figure 4:
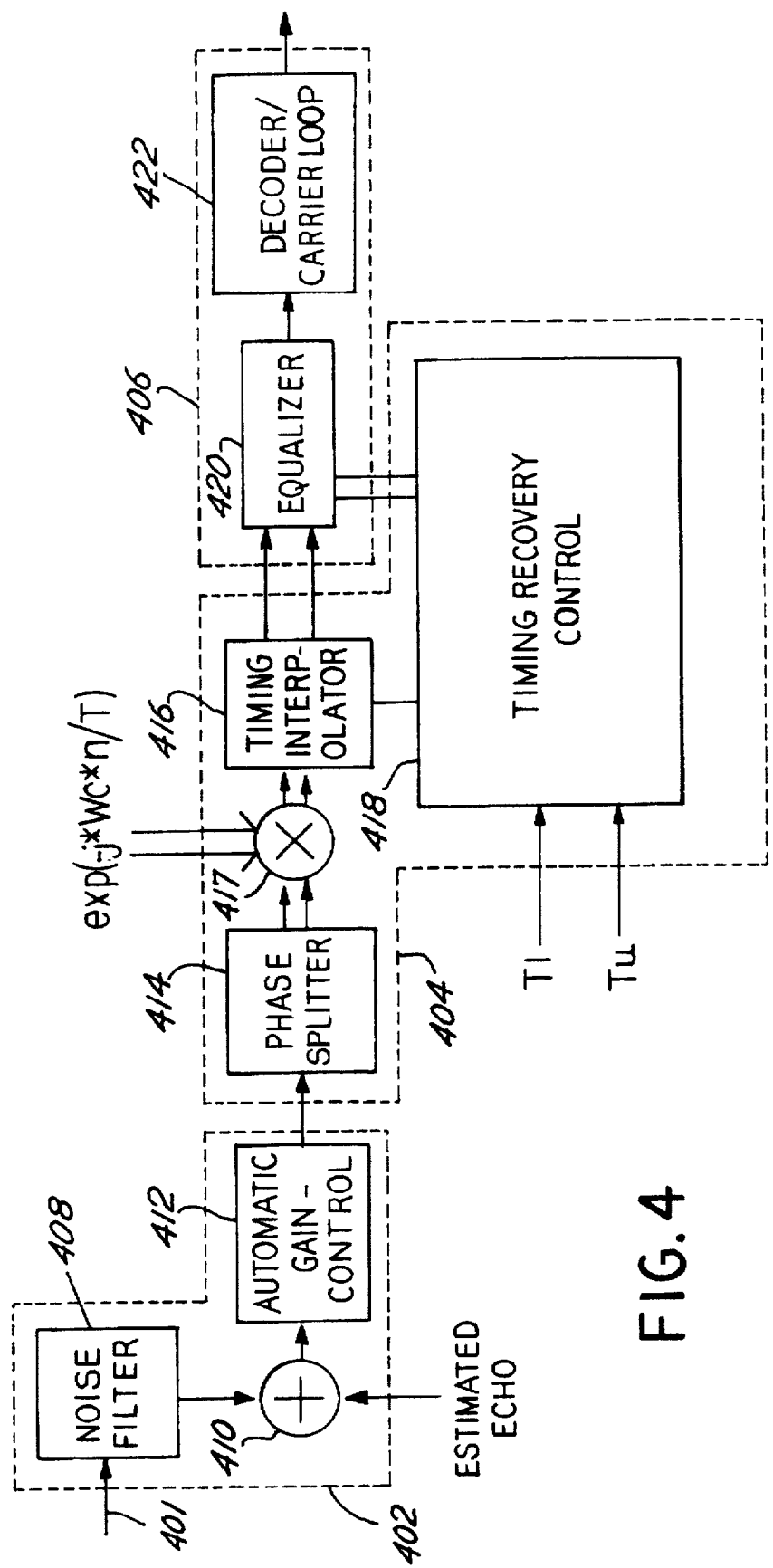
FIG. 4 is a block diagram of the receiver shown in FIG. 1.

The exemplary receiver shown in FIG. 4 includes input, interpolation, and equalization stages as seen at 402, 404 and 406 respectively. The input stage 402 includes a filter 408, summing point 410, and Automatic Gain Control ("AGC") 412. Initial processing of the received transmitted signal 401 is done at the input stage to prepare the signal for further processing.

The input to this first stage is asssumed to be a sequence of discreet time samples represented as digital words that are output from an Analog-to-Digital-Converter (not shown). The noise filter 408 performs several functions, such as filtering of noise added during transmission over the communication channel. The noise filter 408 can also be designed to eliminate D.C. offset imperfections inherent in Analog-to-Digital-Converters often used in modem receivers, as well as power line and power supply noise terms at harmonics of 60 Hz that are introduced by analog electronic components of the modem or terminal equipment. The summing node 410 subtracts an estimate of the local transmitter's echo from the receiver's input path. This is a necessary part of any full duplex modem that utilizes the same band of frequencies for transmission in both directions. The input signal to the Automatic gain Control (AGC) 412 varies in amplitude by 40 dB, or more, depending on the characteristics of the communications channel. The output of the AGC compensates for this uncertainty in receive signal level and furnishes a signal of known constant amplitude to the second stage described below. The second stage includes a phase splitter, timing interpolator, and the Timing Recovery Control Process 418. The phase splitter 414 converts the real signal generated by AGC 412 to its complex components (represented in the drawings by double lines). Such complex components may be represented in the form x+j*y, where x and y are a pair of orthogonal axes that form a two-dimensional space.

The demodulation element 417 shifts the center frequency of the complex signal from the phase splitter 414, which is still centered at the approximately the transmitter's carrier frequency, to approximately zero. This demodulation process is the counterpart of the modulation process 208 in the transmitter block diagram, FIG. 2. The reason that the demodulated signal's center frequency is only approximately zero is because the local time reference that generates the demodulation waveform exp{j*Wc N/T} is, in general, not exactly equal to that of the remote transmitter, and also because the communications channel may introduce frequency shift of several Hertz. This frequency shift is not significant to the operation of the timing recovery system, which is concerned with the difference in upper and lower sideband frequencies, not in the absolute frequencies of the upper and lower sidebands.

The interpolator 416 converts the signal from the demodulation process, which typically is at a sample rate of three samples per symbol, referenced to the local transmitter's symbol rate, to a signal with a sample rate of two samples per symbol, but referenced to the symbol rate of the remote transmitter, which may be significantly different that the local transmitter's symbol rate, as described in the Background of the Invention section. The estimate of the frequency and phase of the remote transmitter is of course produced by the timing recovery system in the local receiver. Under ideal conditions, the local receiver's symbol rate frequency and phase would be precisely equal to that of the remote transmitter, and the channel would not introduce impairments that would make timing recovery problematic. There would be no need for sophisticated timing recovery structures in this case.

Timing interpolator 416 generates a complex signal baseband which is processed by the output stage 406. The output stage includes an equalizer 420 and a decoder, carrier loop, or other equipment 422 that may utilize the data provided. The equalizer receives the complex signal from the timing interpolator and compensates for, or equalizes, the channel response. Such a filter may minimize the intersymbol interference. The modem such as seen at 30 or 28 may include, for example, a decoder, or slicer, that estimates the symbol sequence inherent in the transmitted signal. Such data may then be provided, for example, to the associated computer 24 or 26. The Timing Recovery Control 418 can be understood by first considering a perfect channel, where the transmit waveform arrives at the receiver undistorted. Consider the following sequence of transmitter symbols: "CCCCCCCCCCACACAAAAAAAAA", chosen for the purpose of illustration. It is a possible sequence, although it might not agree with one's intuitive concept of "random".

The envelope derived timing system takes the real and imaginary components of the receive waveform, which is of course sampled at a minimum of twice the symbol rate, and adds together the square of the x (real) component and the square of the y (imaginary) component. Consider the time domain behavior of the Timing Envelope ("TE") during the transmitter sequence above: The timing envelope will stabilize at a Direct Current ("DC") level during the period of "CCCCCCCC" or "AAAAAAAA", or any repeated symbol. The period of "ACACAC" will produce a sinusoid at the symbol rate for the duration of the pattern. This sinusoid contains the frequency and phase information necessary to recovery timing.

From this simple illustration, it can be seen that the timing information is data dependent. Consider the behavior of the timing envelope in the frequency domain. The "CCCCCCCCC" and "AAAAAAAA" patterns produce terms at 0 Hz. (in the transmitter baseband), and the "ACACACAC" pattern produces two tones, at (+/−) Fb/2, where Fb is the symbol rate. The receiver recovers timing information by intermodulating these two tones. This process produces a tone at frequency equal to the difference in the frequencies of the two tones. If the transmitted data pattern is viewed as a series of bursts of alternating patterns interspersed with bursts of repeated symbols, a certain portion of the total transmitter energy is in the regions known as the upper and lower bandedges, at Fb/2 and −Fb/2, respectively, of the data signal. This term is used because the bandedges represent the maximum positive and negative discreet frequencies that can be generated by any valid repeating sequence of symbols.

This concept of timing can be generalized to any pattern and mapping scheme. Any data pattern that produces energy near one bandedge also produces energy near the other bandedge. If these two lobes of energy both survive through the transmission channel, including the transmitter's spectral shaping filter, they may contribute to the timing recovery process in the receiver.

Envelope derived timing as described above works well on channels with moderate amplitude and delay distortion, but may perform poorly when these channel impairments are severe. A preferred embodiment circumvents these problems in an efficient manner by allowing a data receiver's timing recovery system to perform well, even on severely impaired channels with a minimal increase in complexity.

Unlike the energy in the region of the upper and lower bandedges that is useful for recovering timing, the remainder of the energy is not useful for timing recovery, and in fact interferes with the process. This "midband" energy can be thought of as interference or noise from the point of view of the timing recovery system. This concept of a Signal to Signal+Noise Ratio (S/S+NR) can be associated with the timing system.

The effect of amplitude rolloff on the timing envelope's S/S+NR is easy to understand when viewed in the frequency domain. If the energy at (+/−) Fb/2 is severely rolled off, the timing envelope sees much less relative timing energy, and a lower S/S+NR.

Another common problem associated with a communications channel is differential delay distortion. Suppose, for purposes of illustration, that the transmit signal consisted of two sinusoids, one at the lower bandedge and one at the upper bandedge, and that they were turned on simultaneously. This is the signal that would be produced by a burst of "ACACAC" in the example above. Assume that the communications channel has different delay at the two bandedges. Applicants have noted that this delay difference is a more significant factor than the the relative phase of these bandedge components, as others may have assumed. The delay difference (in milliseconds) can represent many symbol intervals. The relative phase difference in these sinusoids can only be resolved to the range 0 to 360 degrees by phase measurement.

Importantly, Applicants have noted that, to achieve optimum timing recovery, it is useful to introduce compensation so that the delays of the lower and upper bandedges are the same at the input to the timing envelope detector.

As mentioned above in the Background of the Invention section, such time delay compensation was not necessary for older modem standards that avoided frequencies in the severely distorted regions of the transmission channel. The problem often appears, however, when the modem attempts to use all available signaling bandwidth to achieve the highest possible data rate.

Following the model described above, the timing envelope exists only when the lower bandedge energy and upper bandedge energy arrive simultaneously, and are intermodulated by the squaring process. Furthermore, this timing envelope is only valid when the simultaneous upper and lower bandedge tones are associated with the same burst of data in the transmitter. No valid indication of timing phase is learned by the receiver if, for example, upper sideband energy associated with one burst of transmitter data coincides with lower sideband energy from a previous burst. The envelope detector may produce a tone at the symbol rate, but the phase and frequency of this tone is incidental, and not in general related to the actual symbol rate. If the differential delay between +Fb/2 and −Fb/2 exceeds the length of a given burst of alternations, no valid timing information is produced by that event. The greater the differential delay between bandedges, the less likely that a bursts of alternations will contribute to timing content in the timing envelope. Therefore, the timing envelope's S/S+NR is reduced for a channel with differential delay distortion.

Figure 5:
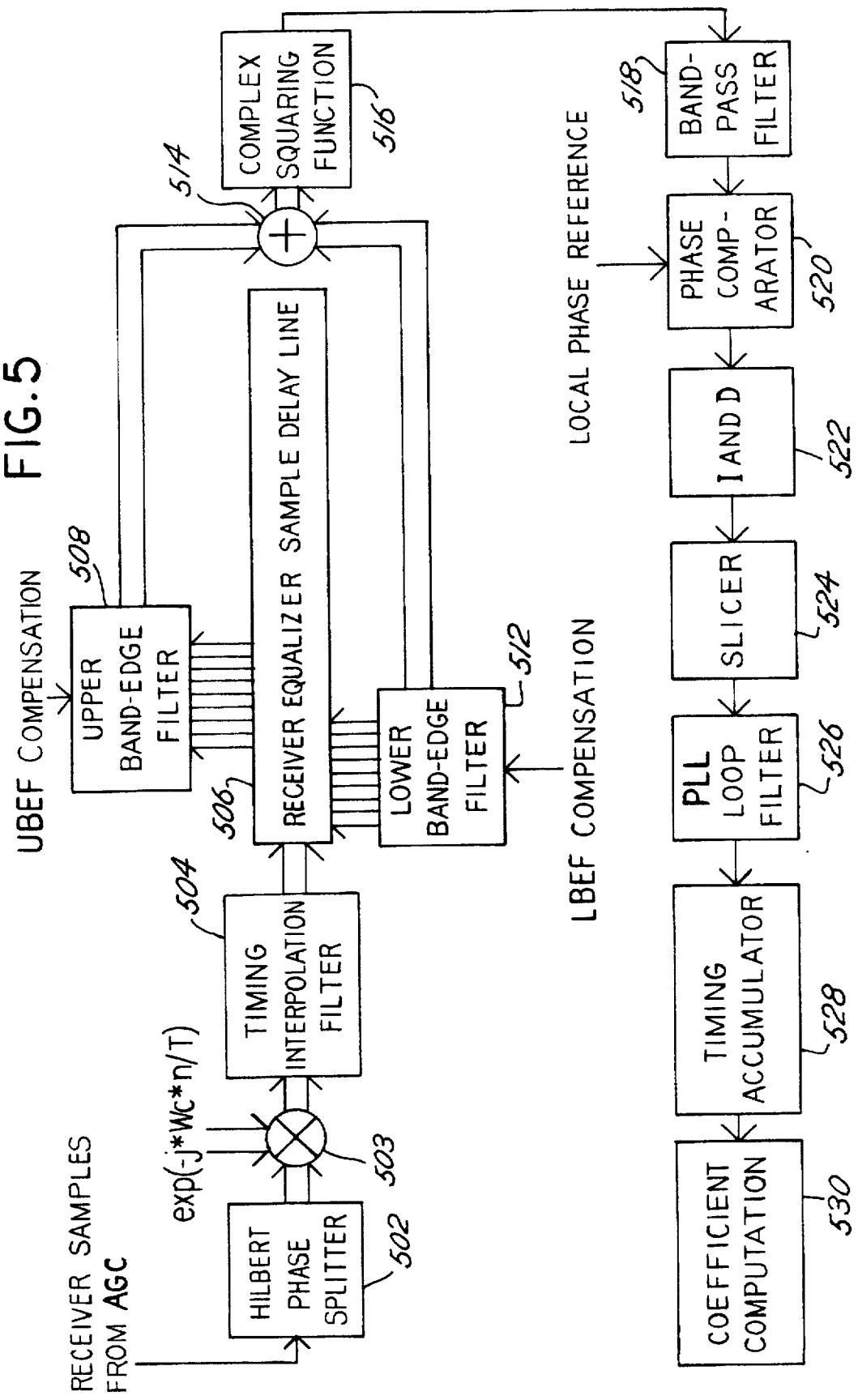
FIG. 5 is a block diagram of the envelope derived timing system shown in FIG. 4.

One embodiment of the equalized envelope derived timing system of the present invention is shown in FIG. 5. Again, this approach is selected for illustration purposes, and there are many ways in which the embodiment shown in FIG. 5 may be implemented.

The embodiment shown in FIG. 5 explicitly compensates for differential delay distortion at the upper and lower bandedges. This embodiment also advantageously compensates for the effects of amplitude distortion on the communications channel.

The signal entering the Timing Interpolation Filter 504 is preferably sampled at a rate of 3 samples per symbol, and the center frequency of this signal is approximately 0. Timing Filter 504 generates an output signal at 2 samples per symbol, with no change in center frequency. These samples are placed in the equalizer delay line 506 where they are used for two purposes: as samples for the adaptive equalizer, which is part of the receiver's data recovery path, and also as samples for the Upper Band Edge Filter (UBEF) 508 and Lower Band Edge Filter (LBEF) 512, which are part of the Envelope Derived Timing Recovery system. The UBEF and LBEF can use different sets of samples from the delay line 506. A preferred embodiment uses 9 samples for the LBEF and 9 samples for the UBEF. For illustration purposes, assume that it has been determined that the the communications channel is delaying the lower bandedge energy more than the upper bandedge by 12 sample intervals. The LBEF could be configured to use the most recent samples, which could be labelled $x(0)-x(8)$, and the UBEF will be configured to use the set of samples $x(12)-x(20)$. (The larger index for xo indicates older, or more delayed, samples). In this manner, the delay in the upper bandedge path may be built out to be equal to the delay in the lower bandedge path. The samples used by the LBEF and UBEF are determined by the inputs Tl and Tu, respectively, which are generated in a manner to be explained.

The complex outputs of the UBEF and LBEF are summed together at the complex summing node 514, and this complex sum is processed by the Complex Squaring Function module 516 to produce the Timing Envelope which is an input to Band Pass filter (BPF) 518. BPF 518 passes energy at the symbol rate, and removes components near D.C. The output of the BPF 518 is processed by the Phase Comparator (PC) 520 which compares the phase of the BPF output to the local timing reference to produce an error term. The output of the PC block 520 is generated at the receive symbol rate.

The error term produced by PC 520 is accumulated over many symbol intervals to advantageously remove the effects of noise and interference from data patterns that do not contain valid timing information. This accumulation is performed by the Integrate and Dump (I and D) block 522. The output of this I and D block is generated at a reduced sample rate. This reduced rate is determined by the integration period of the I and D block, which is preferably 128 symbol periods.

The output of the I and D block is next processed by the Slicer block 524, which performs a SGN function, which generates a +1 or −1 depending on the sign of the input value.

The output of the Slicer is next processed by the PLL Loop Filter (PLL-LF) 526. PLL-LF is advantageously designed to predict the best sample phase and frequency for the Timing Interpolator Filter 504. The output of the PLL-LF is generated at the receive symbol rate and is added to the Timing Accumulator (TA) 528.

The TA 528 takes the predictor information from the PLL-LF, and decides when to begin processing the next batch of receive samples in the Timing Interpolator Filter (TIF) 504, and what timing offset should be used to generate the Interpolator Coefficients that will be used by the TIF. The Number of Samples per Baud (NSPB) output is nominally 3, but can be adjusted +/−1 to accomodate an overspeed or underspeed scenario. TA 528 generates a Timing Interpolator Parameter (TIP) output for the Coefficient Computation (CC) block 530. The Coefficient Computation (CC) block 530 converts the TIP to a set of filter interpolation coefficients with the desired delay characteristics for use by TIF 504.

Amplitude Distortion Compensation

The upper bandedge filter 508 passes energy in a region centered at the upper bandedge, and the lower bandedge filter 512 passes energy in a region centered at the lower bandedge. The rest of the energy which includes all the energy in the center of the band, contains no timing information, and is sharply attenuated by the upper and lower bandedge filters. This has the effect of improving the timing envelope S/S+NR on all channels, but the effect is most dramatic when the channel is severely rolled off at one or both bandedges.

This filtering technique is superior to simple amplitude equalization of the channel prior to extraction of the timing envelope, because equalization boosts the desired energy at the bandedges, but also boosts the unwanted energy near the bandedges.

Delay Distortion Compensation

The group delay at the upper and lower bandedges are defined as Du and D1, respectively. Let Dd=Du−D1, the differential delay between upper and lower bandedges. Assume that Dd can be estimated accurately. Let Dc=compensation delay=−Dd. Then, the two parameters Tu and T1 can be established such that Tu−T1=Dc.

Furthermore, set either T1=0 or Tu=0, depending on the sign of Dc. If Dc is negative, Tu=0, and T1=−Dc. Alternatively, if Dc is positive, T1=0, and Tu=Dc.

Thus, the parameters Tu and T1 are advantageously used to introduce delay into either the upper or lower bandedge filter. The difference in delay in these filters is opposite in sign to the differential delay imposed by the channel. Therefore, the channel delay is equalized in the region that contains timing energy. This compensation is achieved with a single degree of freedom, Dc. This parameter can preferably be estimated at the beginning of modem training, for example, and fixed during data transmission.

This Delay line 506 is part of the modem receiver's adaptive equalizer, which is implemented as an adaptive Finite Impulse Response (FIR) filter. The samples in this delay line are also used as the sample set for the bandedge filter, which is preferably implemented as a fixed coefficient FIR filter. If it is desired to introduce a delay of N symbols in the upper bandedge filter, and the filter has K coefficients, then the most recent 2N samples are skipped, and the next K samples starting at sample 2N, are processed. The equalizer delay line 506 is of finite length, but long enough for the desired compensation. This is because, if the delay line is long enough to compensate for amplitude and delay distortion in general, it is long enough to compensate for the differential delay distortion at a particular pair of frequencies.

The estimation of parameters Tu and T1 can be accomplished by a number of means. In a preferred embodiment, the parameters Tu and T1 are initialized to a compromise value for initial receiver training. The receiver's adaptive equalizer is trained initially with this compromise value for timing compensation. This value for timing compensation will not be optimum for many channels of interest, but this primarily effects long term stability of the receiver, and does not significantly effect the short term convergence of the equalizer.

At a convenient point in the training sequence, the equalizer coefficients are analyzed. The delay distortion is computed at a point near the upper bandedge, and a corresponding point near the lower bandedge. The two delays are subtracted to produce the desired result, Dc. Tu and T1 are then determined as discussed above. The bandedges are preferably not used because the adaptive equalizer can generate an ambiguous result at these particular frequencies.

Several alternative methods exist to determine the appropriate time delay to compensate for delay distortion, including compromise delay equalizer at input of the modem receiver. Also, the modem may simply conduct a test during a training, or handshake, sequence before any data is transmitted. During the training sequence, the bandedge delay for a known signal may be measured and then used for appropriate compensation during the later data transmission.

The input to the Timing Interpolator Filter 504 shown in FIG. 5 is a sequence of complex numbers −x(n)+j'y(n) (the time index n is understood). This frequency spectrum of this complex baseband signal is centered at 0, and has both positive and negative frequencies. The upper bandedge filter substantially passes only positive frequencies centered around +fb/2, and the lower bandedge filter only negative frequencies centered around −fb/2.

In order for a filter to discriminate between positive and negative frequencies, it must operate on complex numbers. These filters also must have complex coefficients. Hence the inputs are complex, the coefficients are complex, and the two outputs are complex.

The coefficients for the UBEF 508 and LBEF 512 are preferably generated by first designing a low pass prototype filter, and then modulating this prototype filter's coefficients by a complex sinusoid at +fb/2, and at −fb/2, which generates the two sets of coefficients desired, for the upper and lower bandedge filters. Although the foregoing description of the preferred embodiment will enable a person of ordinary skill in the art to make and use the invention, five detailed assembly language subroutine__listings are included below. The first listing subroutine, entitled "Estimate Differential Delay Compensation," estimates the differential delay distortion near the upper and lower bandedges, and generates the paramters Tu and T1, which determine what samples are used by the UBEF and LBEF.__ The second listing, subroutine, entitled "Receiver Baud Timing Recovery System," implements TIF 504 management, UBEF/LBEF 508/512 management, complex summing node 514, Complex Squaring Function 516, BPF 518, and PC 520 functions.

The third listing, entitled "Baud Loop Filter," implements the Slicer 524, PLL-LF 526, TA 528 functions, and the UBEF/LBEF 508/512 filter functions. The code for managing the UBEF/LBEF function is contained in the "Receiver Baud Timing Recovery System" listing described above.

The fourth listing, entitled "Update Baud Timing Parameter," decomposes the data from the Timing Accumulator into two parts: (1) NSPB, nominally 3, but adjusted by +1 or −1 depending depending on relative frequencies of local and remote symbol rate, and accumulated error, and (2) The Timing Interpolation Parameter which is used to generate the coefficients of the interpolator filters. This subroutine also generates the coefficients for this timing interpolator. The fifth listing, entitled "3:2 Timing Interpolator," computes the T/2 outputs for the Receive Equalizer Sample Delay Line 506 based on the interpolation coefficients. While the code for this interpolator function resides in "3:2 Timing Interpolator", it is under the control of code in the "Receiver Baud Timing Recovery System" described above. Each of the programs listed below may be converted into machine executable form using the '320C2/C5x Assembler available from the Texas Instruments Corporation. Additional detailed features of the system will become apparent to those skilled in the art from reviewing these programs.

```
         Copyright © 1995 U.S. Robotics Corp.
         **********************************************************
         *           ESTIMATE DIFFERENTIAL DELAY COMPENSATION     *
         **********************************************************
5
         *    Estimate differential delay between upper and lower bandedge
         *    using frequencies near the bandedges.

.if     intlen=6          ; 6-tap Lagrange interpolator
10
         eqlen       .equ    80              ; equalizer length
         ti          .equ    tr+eqlen+2      ; imaginary taps theta_dly     .equ  488*32          ; nominal freq = 61/64·2048/4
15       theta_dly_md  .equ  theta_dly-32    ; delta angle for 61/64 bandedge - δ
         theta_dly_pd  .equ  theta_dly+32    ; delta angle for 61/64 bandedge + δ

.def    calc_delay_compensation 20       calc_delay_compensation
             ldp     #6
             lar     ar2,#hru_pd       ; pointer to result table
             calld   comp_hz           ; compute phasors at ±(61/64 + δ)
             splk    #theta_dly_pd,tempw
25
             calld   comp_hz           ; compute phasors at ±(61/64 - δ)
             splk    #theta_dly_md,tempw lar     ar1,#hil_pd       ; calculate phase at lower bandedge + δ
30           calld   arctan
             lar     ar2,#hrl_pd
             sach    phl_pd,2 lar     ar1,#hil_md       ; calculate phase at lower bandedge - δ
35           calld   arctan
             lar     ar2,#hrl_md
             sach    phl_md,2 lar     ar1,#hiu_md       ; calculate phase at upper bandedge - δ
40           calld   arctan
             lar     ar2,#hru_md
```

```
            sach    phu_md,2 lar     ar1,#hiu_pd     ; calculate phase at upper bandedge + δ
            calld   arctan
 5          lar     ar2,#hru_pd
            sach    phu_pd,2

*       delay estimation: τ(low) = -δΘ(low)/δf = k·(phl_pd - phl_md)
    *                         τ(hi)  = -δΘ(hi)/δf  = k·(phu_md - phu_pd)
10
            lacc    phu_md,16       ; differential delay τ(hi)-τ(low)
            sub     phu_pd,16
            sub     phl_pd,16
            add     phl_md,16
15          sach    tempx           ; tempx = equalizer delay difference lacc    tempx           ; sign extend the delay
            add     one,6           ; correct for truncation
            bsar    7               ; convert to 2T units
20          sacb
            lacl    #12             ; limit range: -2·2T ≤ b_comp ≤ 12·2T
            crlt
            lacc    #-2
            crgt
25          retd
            ldp     #7
            sacl    b_comp

*       Calculate: Σtr·cos, Σti·sin, Σtr·sin, Σti·cos
30  *       Input/output: tempw = delta angle for theta VCO
    *                     ar2 -> hru,hiu,hrl,hil (32-bits each)

*       Set up cosine table 35  comp_hz
            calld   gen_sin                 ; cos(Θ) = sin(Θ + π/2)
            splk    #16384,tempz    ; start with +π/2 for cos(Θ)

*       calld   gen_cos
40  *       splk    #0,tempz        ; start with zero angle for cos(Θ)
```

```
*       Compute Σtr(n)·cos(ß·n)

spm     3               ; reduce gain for DFT's
        lar     ar1,#tr
5       zap
        rpt     #eqlen-1
         mac    dftbuf,*+
        apac
        add     one,11
10      sach    tr_cos,4        ; Σtr·cos

*       Compute Σti(n)·cos(ß·n)

adrk    #ti-(tr+eqlen)
15      zap
        rpt     #eqlen-1
         mac    dftbuf,*+
        apac
        add     one,11
20      sach    ti_cos,4        ; Σti·cos
        spm     1               ; restore product mode

*       Set up sine table 25      calld   gen_sin
        splk    #0,tempz        ; start with zero angle for sin(Θ)

*       calld   gen_cos         ; sin(Θ) = cos(Θ - π/2)
*       splk    #-16384,tempz   ; start with -π/2 for sin(Θ)
30
*       Compute Σtr(n)·sin(ß·n)

spm     3               ; reduce gain for DFT's
        lar     ar1,#tr
35      zap
        rpt     #eqlen-1
         mac    dftbuf,*+
        apac
        add     one,11
40      sach    tr_sin,4        ; Σtr·sin
```

```
*       Compute Σti(n)·sin(ß·n)

adrk    #ti-(tr+eqlen)
        zap
 5      rpt     #eqlen-1
        mac     dftbuf,*+
        apac
        add     one,11
        sach    ti_sin,4        ; Σti·sin
10      spm     1               ; restore product mode

*       Compute: hru, hrl, hiu, hil
*       hru = Σtr·cos - Σti·sin
*       hiu = Σti·cos + Σtr·sin
15 *    hrl = Σtr·cos + Σti·sin
*       hil = Σti·cos - Σtr·sin mar     *,2
        lacc    tr_cos          ; Σtr·cos
20      sub     ti_sin          ; Σti·sin
        sach    *+              ; upper real
        sacl    *+
        add     ti_sin,1        ; Σti·sin
        sach    *+              ; lower real
25      sacl    *+ lacc    ti_cos          ; Σti·cos
        add     tr_sin          ; Σtr·sin
        sach    *+              ; upper imaginary
30      sacl    *+
        sub     tr_sin,1        ; Σtr·sin
        retd
        sach    *+
        sacl    *+,0,1          ; lower imaginary
35
*       Calculate sine table gen_sin
                lar     ar1,#dftbuf     ; destination of cos/sin
40              lacl    #eqlen-1
                samm    brcr
```

```
                lacc    tempz,16        ; get initial angle
                rptb    sin_loop-1 call    sin
5               sach    *+
                lacc    tempz,16        ; advance angle
                add     tempw,16
                sach    tempz
        sin_loop
10              ret .endif 15
        ****************************************************************
        *               RECEIVER BAUD TIMING RECOVERY SYSTEM          *
        ****************************************************************

20      *       This system recovers receiver timing from the subtle variation
        *       in power created by the far end transmitter's modulation rate.
        *       The output from the receiver phase splitter is interpolated to
        *       a baseband output at the far end transmitter's τ/2 rate.
        *       This process runs at baud rate.
25
        recover_timing
                bit     b_time,b15      ; is baud timing parameter reaching later?
                lar     ar0,#2          ; no, calc τ/2 from earlier samples
                xc      1,tc
30              lar     ar0,#1          ; yes, calc τ/2 from later samples calld   interp_baud     ; calc τ and τ/2 samples, (arp = 2 on exit)
                lacc    #a_coef                 ; point to variable coefficients 35              .if     intlen=6        ; 6-tap Lagrange interpolator

*       Error signal is computed as follows:
        *       [ru(n) + rl(k)]² + [iu(n) + il(k)]²
        *       - [ru(n+1) + rl(k+1)]² - [iu(n+1) + il(k+1)]²
40
        *       Differential delay in 2T: b_comp = (n - k)/4
```

```
*       Filter band edge, calc power envelope, integrate error signal lar     ar0,#2          ; indx = 2 for band edge filters 5       bit     b_comp,b15
        bcnd    neg_delay,tc lamm    ar2             ; ar2 -> xr(k)
        add     b_comp,2
10      samm    ar4             ; ar4 -> xr(n)

lamm    ar3             ; ar3 -> xi(k)
        bd      calc_timing_error
        add     b_comp,2
15      samm    ar5             ; ar5 -> xi(n)

neg_delay
        lamm    ar2
        samm    ar4             ; ar4 -> xr(n)
20      sub     b_comp,2
        samm    ar2             ; ar2 -> xr(k)

lamm    ar3
        samm    ar5             ; ar5 -> xi(n)
25      sub     b_comp,2
        samm    ar3             ; ar3 -> xi(k)

calc_timing_error
        call    timing_error,*,2
30      calld   timing_error,*,2
        dmov    tempw
        dmov    tempy lar     ar4,#b_inth
35      spm     0
        sqra    tempx           ; calculate power envelope
        lacc    *+,16
        adds    *-
        sqra    tempz
40      sqra    tempw
        sqrs    tempy
```

```
        spac
        spm    1              ; restore product mode
        sach   *+             ; integrate baud loop error
        sacl   *-,0,1

.else                 ; 4-tap Lagrange interpolator calld  integrate_error
        lar    ar4,#b_inth    ; integrate baud loop error in b_int .endif

*************************************************************
*            BAUD LOOP FILTER (receiver timing recovery)    *
*************************************************************

*    b_vco increasing => moving later in time
*    Make second order correction baud_filter
        lt     b_int2         ; scale second order integrator output
        mpy    #40            ;   for ±200 ppm correction range (B2)
        pac
        add    b_vcoh,16      ; make timing adjustment
        adds   b_vcol
        sach   b_vcoh
        sacl   b_vcol lacc   b_cnt          ; integrate/dump period over?
        sub    #1
        sacl   b_cnt
        retc   neq            ; no, continue integration dmov   b_reload       ; yes, reload counter bit    b_inth,b15     ; slice baud loop integrator
        sach   b_inth         ; zero baud loop integrator
        sacl   b_intl
```

BANNER & ALLEGRETTI, LTD.
10 South Wacker Drive
Suite 3000
Chicago, Illinois 60606
Telephone (312) 715-1000

```
            lacc    b_beta1,16      ; baud loop β1
            xc      1,tc
            neg
            setc    ovm             ; update second order integrator
5           add     b_int2,16       ;  with ± bbetav
            sach    b_int2
            clrc    ovm

*   Make first order correction
10
            lacc    b_alpha         ; baud loop α
            xc      1,tc
            neg
            retd
15          add     b_vcoh          ; make first order correction
            sacl    b_vcoh          ;   with ± balfav
                                    ; exit baud filter

*   Lower band edge filter - starts at offset position k
20   *       rl(k) = ½·xr(k) - xi(k+1) - xr(k+2) + xi(k+3) + xr(k+4)
     *              - xi(k+5) - xr(k+6) + xi(k+7) + ½·xr(k+8)
     *       il(k) = ½·xi(k) + xr(k+1) - xi(k+2) - xr(k+3) + xi(k+4)
     *              + xr(k+5) - xi(k+6) - xr(k+7) + ½·xi(k+8)

25   *   Upper band edge filter - starts at offset position n
     *       ru(n) = ½·xr(n) + xi(n+1) - xr(n+2) - xi(n+3) + xr(n+4)
     *              + xi(n+5) - xr(n+6) - xi(n+7) + ½·xr(n+8)
     *       iu(n) = ½·xi(n) - xr(n+1) - xi(n+2) + xr(n+3) + xi(n+4)
     *              - xr(n+5) - xi(n+6) + xr(n+7) + ½·xi(n+8)
30
            .if     intlen=6        ; 6-tap Lagrange interpolator

*   real part: rl(n) + ru(k)

35   timing_error
            lacc    *0+,11          ; +½·xr(k)    lower real
            sub     *0+,12          ; -xr(k+2)
            add     *0+,12          ; +xr(k+4)
            sub     *0+,12          ; -xr(k+6)
40          add     *-,11,3         ; +½·xr(k+8)
            mar     *+
```

```
        add    *0+,12           ; +xi(k+1)
        sub    *0+,12           ; -xi(k+3)
        add    *0+,12           ; +xi(k+5)
        sub    *+,12,4          ; -xi(k+7)
5
        add    *0+,11           ; +½·xr(n)       upper real
        sub    *0+,12           ; -xr(n+2)
        add    *0+,12           ; +xr(n+4)
        sub    *0+,12           ; -xr(n+6)
10      add    *-,11,5          ; +½·xr(n+8)
        mar    *+
        sub    *0+,12           ; -xi(n+1)
        add    *0+,12           ; +xi(n+3)
        sub    *0+,12           ; -xi(n+5)
15      add    *+,12,3          ; +xi(n+7)
        add    one,15
        sach   tempw            ; save rl(n) + ru(k)

*       imaginary part: il(n) + iu(k)
20
        lacc   *0-,11           ; +½·xi(k+8)     lower imag
        sub    *0-,12           ; -xi(k+6)
        add    *0-,12           ; +xi(k+4)
        sub    *0-,12           ; -xi(k+2)
25      add    *+,11,2          ; +½·xi(k)

sub    *0-,12           ; -xr(k+7)
        add    *0-,12           ; +xr(k+5)
        sub    *0-,12           ; -xr(k+3)
30      add    *,12,5           ; +xr(k+1)

add    *0-,11           ; +½·xi(n+8)    upper imag
        sub    *0-,12           ; -xi(n+6)
        add    *0-,12           ; +xi(n+4)
35      sub    *0-,12           ; -xi(n+2)
        add    *+,11,4          ; +½·xi(n)

add    *0-,12           ; +xr(n+7)
        sub    *0-,12           ; -xr(n+5)
40      add    *0-,12           ; +xr(n+3)
        sub    *,12             ; -xr(n+1)
```

```
                retd
                add     one,15
                sach    tempy           ; save iu(n) + il(k)

.endif

*********************************************************************
*                   UPDATE BAUD TIMING PARAMETER                     *
*********************************************************************

*       The number of samples per baud time (nspb) is set to the default
*       value. The baud timing parameter is updated as necessary.
*       If a wrap occurs, nspb is adjusted to correspond.

*       On entry, b_vcoh = timing correction, (+/- is later/earlier)
*       On exit, a and b coefficients modified, nspb = 2,3, or 4
*               b_vcoh = 0 (integrated correction resides in b_time)

update_b_time
                lacc    b_vcoh          ; get timing correction
                splk    #0,b_vcoh       ; (zero the correction)
                adds    b_time          ; make the correction, acch = -1,0,1
                sacl    b_time
                add     #30h,12         ; calc # samples required for next baud
                sach    nspb            ; nspb = 2,3,4

*       Calculate current baud timing phase for synchronous mode.
*       b_phase is examined during the timer interrupt and compared with
*       the transmit/receive phase difference measured by the ASIC to
*       advance or retard the timer interrupt.

calc_phase
                lacl    nspb            ; calculate current baud sector
                sub     #3
                adds    b_sector        ; modulo N reduction
                lar     ar1,#b_modulus  ; N = 84,96,98,105,112,120
                xc      1,lt
                adds    *
                subs    *
```

```
        nop
        xc      1,lt
        adds    *
        sacl    b_sector        ; acc = (nspb - 3 + b_sector).mod.N mar     *+
        lt      *+              ; b_scale = 28/N
        mpyu    b_time
        sph     tempx           ; b_phase = (b_sector·2^16 + b_time)·28/N
        mpyu    b_sector
        pac
        adds    tempx
        sfr                     ; (compensate for pm = 1)
        sacl    *               ; save baud timing phase

*       Calculate baud interpolator coefficients
*       The coefficients are half scale to prevent overflow.

calc_coef
        lacl    b_time          ; adjust to 0-7ffh range
        sfr
        sacl    p_linear
        calld   calc_a_or_b     ; calculate coefficients for "a" series
        lar     ar1,#a_coef lacl    b_time          ; adjust timing parameter by 1/2 for "b" series
        xor     #8000h
        sfr                     ; adjust to 0-7ffh range
        sacl    p_linear .if     intlen=6        ; 6-tap Lagrange interpolator

*       f_-3(p) =  1/120·p^5              - 1/24·p^3              + 1/30·p
*       f_-2(p) = -1/24·p^5  + 1/24·p^4 + 7/24·p^3 - 1/24·p^2 -  1/4·p
*       f_-1(p) =  1/12·p^5  -  1/6·p^4 - 7/12·p^3 +  2/3·p^2 +       p
*       f_0(p)  = -1/12·p^5  +  1/4·p^4 + 5/12·p^3 -  5/4·p^2 -  1/3·p + 1
*       f_1(p)  =  1/24·p^5  -  1/6·p^4 - 1/24·p^3 +  2/3·p^2 -  1/2·p
*       f_2(p)  = -1/120·p^5 + 1/24·p^4 - 1/24·p^3 - 1/24·p^2 + 1/20·p one_10th        .equ    3277    ; "one" = 32768
one_12th        .equ    2731
```

```
       one_15th    .equ    2185
       one_60th    .equ    546 calc_a_or_b
 5         sqra    p_linear
           sph     p_squared
           mpy     p_squared
           sph     p_cubed
           mpy     p_cubed
10         sph     p_fourth
           mpy     p_fourth
           sph     p_fifth lt      p_fifth
15         mpy     #one_60th       ; +1/120·p^5
           ltp     p_linear
           sacb                    ; (accb = 1/60·p^5)
           mpy     #one_15th       ; +1/30·p
           lta     p_cubed
20         mpy     #one_12th       ; -1/24·p^3
           spac
           bsar    2
           sach    *+              ; save f_-3(p), half scale
           ltp     p_squared
25         sach    tempx,3         ; (tempx = 2/3·p^3)
           mpy     #one_12th
           ltp     p_fourth
           sach    tempw,3         ; (tempw = 2/3·p^2)
30         mpy     #one_12th       ; +1/24·p^4
           ltp     p_fifth
           sach    tempy,3         ; (tempy = 2/3·p^4)
           mpy     #one_12th       ; -1/24·p^5
           spac
35         bsar    2
           add     p_cubed,13      ; +7/24·p^3
           add     tempx,11
           sub     tempw,11        ; -1/24·p^2
           sub     p_linear,13     ; -1/4·p
40         sach    *+              ; save f_-2(p), half scale
           ltp     p_linear
```

```
           sach    tempz,3          ; (tempz = 2/3·p^5)

lacc    tempz,12         ; +1/12·p^5
           sub     tempy,13         ; -1/6·p^4
 5         sub     p_cubed,14       ; -7/12·p^3
           sub     tempx,12
           add     tempw,15         ; +2/3·p^2
           add     p_linear,15      ; +p
           sach    *+               ; save f_-1(p), half scale
10
           lacc    p_fourth,12      ; +1/4·p^4
           sub     tempz,11         ; -1/12·p^5
           add     p_cubed,12       ; +5/12·p^3
           add     tempx,12
15         sub     p_squared,14     ; -5/4·p^2
           sub     p_squared,12
           mpy     #one_12th        ; -1/3·p
           spac
           add     #4000h,15        ; +1
20         sach    *+,1             ; save f_0(p), half scale lacc    tempz,11         ; +1/24·p^5
           sub     tempy,13         ; -1/6·p^4
           sub     tempx,11         ; -1/24·p^3
25         add     tempw,15         ; +2/3·p^2
           sub     p_linear,14      ; -1/2·p
           sach    *+               ; save f_1(p), half scale mpy     #one_10th        ; +1/20·p
30         pac
           sbb                      ; -1/120·p^5
           bsar    2
           add     tempy,11         ; +1/24·p^4
           sub     tempx,11         ; -1/24·p^3
35         retd
           sub     tempw,11         ; -1/24·p^2
           sach    *+               ; save f_2(p), half scale .else                    ; 4-tap Lagrange interpolator
40
  *        f_-2(p) = 1/6·p^3         - 1/6·p
```

```
*       f_-1(p) = -1/2·p^3 + 1/2·p^2 +     p
*       f_0(p)  =  1/2·p^3 -     p^2 - 1/2·p + 1
*       f_1(p)  = -1/6·p^3 + 1/2·p^2 - 1/3·p one_12th    .equ   1365     ; "one" = 16384 calc_a_or_b
        sqra    p_linear
        sph     p_squared
        mpy     p_squared
        sph     p_cubed mpy     #one_12th            ; T reg = p_linear
        ltp     p_cubed
        sach    tempx,3              ; save 2/3·p
        neg
        mpy     #one_12th
        apac
        sach    *+,1                 ; f_-2(p) = 1/6·p^3 - 1/6·p
        pac
        sach    tempy,3              ; save 2/3·p^3 lacc    p_squared,13
        sub     p_cubed,13
        add     p_linear,14
        sach    *+,1                 ; f_-1(p) = -1/2·p^3 + 1/2·p^2 + p lacc    p_cubed,13
        sub     p_squared,14
        sub     p_linear,13
        add     #4000h,15
        sach    *+,1                 ; f_0(p) = 1/2·p^3 - p^2 - 1/2·p + 1 lacc    p_squared,13
        sub     tempy,13
        retd
        sub     tempx,14
        sach    *+,1                 ; f_1(p) = -1/6·p^3 + 1/2·p^2 - 1/3·p .endif
```

BANNER & ALLEGRETTI, LTD.
10 South Wacker Drive
Suite 3000
Chicago, Illinois 60606
Telephone (312) 715-1000

```
************************************************************
*                  3 : 2 TIMING INTERPOLATOR                *
************************************************************
*      Calculate τ and τ/2 equalizer input points and integrate baud loop
*      error signal.

*      On entry, acc = addr of coefficients in program memory
*           ar0 = selected offset to τ/2 samples = 1 or 2
*           ar2,ar3 -> (xr0,xi0), the equalizer input
*           ar4 -> baud loop error integrator (32 bits)

*      On exit, (xr0,xi0) and (xr1,xi1) have been updated.
*           ar2,ar3 -> (xr0,xi0), the equalizer input
*           Baud loop error has been integrated.

fir     .macro      intlen
        zap
        rpt         #intlen-1       ; 4 or 6-tap FIR filter
        mads        *+
        apac
        add         one,14          ; correct for truncation
        .endm interp_baud
        samm        bmar            ; save coeff addr

*      Compute a τ spaced receiver sample lar         ar1,#rint_real  ; calc real sample
        fir         intlen
        mar         *,2             ; save τ real
        sach        *+,1,1 adrk        #2              ; calc imag sample
        fir         intlen
        mar         *0+,3           ; save τ imag
        sach        *+,1,1

*      Compute the previous τ/2 spaced receiver sample
```

```
        lamm    bmar                    ; switch to b coefficients
        add     #intlen
        samm    bmar
        sbrk    #intlen*2+2             ; calc real sample
 5      fir     intlen
        mar     *,2                     ; save τ/2 real
        sach    *-,1,1 adrk    #2                      ; calc imag sample
10      fir     intlen
        retd
        mar     *,3                     ; save τ/2 imag
        sach    *-,1,2

15
*       Interpolator coefficients for baud timing synchronization

.if     intlen=6                ; 6-tap Lagrange interpolator 20  cbs_coef0                           ; 0° coeff, b_time = 1
        .word   0,0,16384,0,0,0         ; τ
        .word   192,-1600,9600,9600,-1600,192   ; τ/2 cbs_coef90                          ; 90° coeff, b_time = 1/4
25      .word   126,-990,4620,13860,-1386,154   ; 3τ/4
        .word   154,-1386,13860,4620,-990,126   ; τ/4

.else                           ; 4-tap Lagrange interpolator 30  cbs_coef0                           ; 0° coeff, b_time = 1
        .word   0,16384,0,0             ; τ
        .word   -1024,9216,9216,-1024   ; τ/2, (-1,9,9,-1)/16·16384 cbs_coef90                          ; 90° coeff, b_time = 1/4
35      .word   -640,4480,13440,-896    ; 3τ/4, (-5,35,105,-7)/128·16384
        .word   -896,13440,4480,-640    ; τ/4

.endif
```

A preferred embodiment of the present invention has been described herein. It is to be understood, of course, that changes and modifications may be made in the embodiment without departing from the true scope and spirit of the present invention, as defined by the appended claims.

We claim:

1. In an electronic data receiver, an envelope derived timing system for receiving a modulated signal which contains encoded information containing energy at an upper bandedge and at a lower bandedge, comprising:

a timing interpolator; and a timing loop interconnected to said timing interpolator, said timing loop including, a timing compensator for receiving said modulated signal and temporally adjusting said upper bandedge energy with respect to said lower bandedge energy to compensate for delay distortion of said modulated signal at said upper bandedge and said lower bandedge, and responsively providing time-compensated component signals, and a timing recovery system that processes said time-compensated component signals and responsively provides a phase control signal to said interpolator.

2. A receiver for accepting a transmitted signal generated by a remote transmitter and responsively providing an equalized signal to a decoder, said receiver comprising, in combination:

a demodulator for providing a complex baseband signal a timing interpolator for receiving said complex baseband signal from said demodulator and providing interpolated samples, in accordance with a phase control signal, at a rate synchronized in phase and frequency to symbol transitions in said transmitted signal, said interpolated samples being a complex signal having upper and lower bandedge components;

a timing loop interconnected to said timing interpolator, said timing loop including a timing compensator for receiving said interpolated samples and providing time compensated signals in accordance with a compensating delay, said compensating delay compensating for the differential delay between said upper and lower bandedge components, and a timing envelope sensor for receiving said time-compensated signals and responsively providing said phase control signal to said interpolator; and an equalizer for receiving said samples from said interpolator, reducing intersymbol interference, and providing an equalized signal to said decoder.

3. A receiver as claimed in claim 2 further comprising an estimator for determining said differential delay between said upper and lower bandedge component signals and for generating said compensating delay.

4. A receiver as claimed in claim 3 wherein said estimator includes training means for receiving a known signal over said communications channel and for measuring an actual time delay distortion based upon said received known signal to generate said compensating delay.

5. A receiver as claimed in claim 4 wherein said equalizer includes an adaptive filter which generates a plurality of coefficients and said estimator selects said coefficients in accordance with said compensating delay.

6. A method for recovering a timing envelope in an electronically transmitted signal comprising, in combination:

splitting said transmitted signal into a complex signal;

generating a delay measurement indicative of the relative delay between upper and lower bandedge components of said complex signal;

compensating for delay distortion between said upper and lower bandedge components in response to said delay measurement and responsively determining a synchronization rate;

separating said complex signal into samples at said synchronization rate;

equalizing said samples; and decoding said samples into data.

7. A method as claimed in claim 6 wherein said transmitted signal defines a symbol rate and at least first and second frequencies corresponding to said synchronization rate and wherein said method further comprises filtering said complex signal to obtain first and second frequency signals and utilizing said first and second frequency signals to determine said synchronization rate.

8. A method as claimed in claim 6 wherein the step of generating a delay measurement comprises the step of receiving a known signal, measuring an actual time delay distortion based upon said received known signal, and generating said delay measurement as a function of said actual time delay distortion.

9. A symbol timing control apparatus comprising:

a sample delay line;

a timing filter connected to said sample delay line, said timing filter having an upper bandedge filter and a lower bandedge filter, said timing filter adapted to adjust the relative phase between said upper bandedge filter and said lower bandedge filters in response to a delay estimation signal;

an estimator connected to said timing filter to provide said delay estimation signal; and a timing recovery system responsive to said timing signal for generating a timing error signal.

10. The apparatus of claim 9 further comprising an interpolation filter connected to said sample delay line, said interpolation filter outputting said first sampled data sequence to said sample delay line, wherein said first sampled data sequence is generated from a second sampled data sequence in response to said timing error signal.

11. The apparatus of claim 9 wherein said timing filter is a finite impulse response filter.

12. The apparatus of claim 9 further comprising an equalizer coupled to said sample delay line.

13. A receiver as claimed in claim 12 wherein said equalizer includes equalizer coefficients and said estimator determines said delay estimation signal in response to said equalizer coefficients.

14. The apparatus of claim 9 wherein said upper bandedge filter and said lower bandedge filter accept inputs from said sample delay line at positions determined by said estimator.

15. The apparatus of claim 3 wherein said equalizer includes equalizer coefficients and said estimator determines said compensating delay in response to said equalizer coefficients.

16. A timing recovery apparatus comprising:

an interpolation filter having interpolation coefficients;

a tap delay line connected to said interpolation filter;

a delay estimator;

a timing filter connected to said tap delay line and said delay estimator, said timing filter having an upper bandedge filter and a lower bandedge filter, wherein the relative phase response between said upper and lower bandedge filters is determined in response to said delay estimator;

a squaring device connected to said timing filter;

a phase comparator connected to said squaring device, wherein said interpolation coefficients are adjusted in response to said phase comparator.

* * * * *